United States Patent
Tate et al.

(10) Patent No.: US 7,412,747 B2
(45) Date of Patent: Aug. 19, 2008

(54) MEANS FOR COLLECTING GARDEN WASTE

(75) Inventors: Clare Tate, Newton Aycliffe (GB); John Sadler, Darlington (GB); Nigel Robson, Tyne & Wear (GB)

(73) Assignee: Black & Decker Inc., Newark, DE (US)

( * ) Notice: Subject to any disclaimer, the term of this patent is extended or adjusted under 35 U.S.C. 154(b) by 662 days.

(21) Appl. No.: 10/768,955

(22) Filed: Jan. 30, 2004

(65) Prior Publication Data

US 2005/0177973 A1    Aug. 18, 2005

(30) Foreign Application Priority Data

Jan. 31, 2003    (GB)    .................................. 0321 70.6

(51) Int. Cl.
*A47L 9/00*    (2006.01)
(52) U.S. Cl. .............................. 15/330; 15/344; 15/345; 15/352
(58) Field of Classification Search ........................ None
See application file for complete search history.

(56) References Cited

U.S. PATENT DOCUMENTS

| | | | |
|---|---|---|---|
| 2,159,116 A | | 5/1939 | Zacharias |
| 3,683,446 A | * | 8/1972 | Tell .............................. 15/330 |
| 4,601,735 A | | 7/1986 | Morton, Jr. |
| 5,096,337 A | * | 3/1992 | Denton ........................ 406/105 |
| 5,308,369 A | | 5/1994 | Morton et al. |
| 5,862,595 A | * | 1/1999 | Keane .......................... 30/124 |
| 5,863,425 A | | 1/1999 | Herlehy et al. |
| 2002/0108206 A1 | | 8/2002 | Svoboda et al. |

FOREIGN PATENT DOCUMENTS

JP    11169627    6/1999

\* cited by examiner

*Primary Examiner*—David A Redding
(74) *Attorney, Agent, or Firm*—John Yun; Bruce S. Shapiro; Wesley Muller

(57) ABSTRACT

The present invention provides a blower-vacuum device having means for collecting garden waste, the garden waste collecting means comprising: an attachment part (42) for receiving a garden waste receptacle; and a garden waste receptacle (30) for removable engagement with the attachment part; wherein the attachment part (42) comprises an arcuate groove (44); and the garden waste receptacle (30) comprises a band (33) defining a mouth (35) of the receptacle for sliding engagement with the groove. Thus the receptacle may be easily removed from the attachment part of the blower-vacuum device merely by sliding the band (33) of the receptacle out of the groove (44), whereupon the receptacle may then be emptied of garden waste by tipping it upside-down. In a preferred embodiment, the band (33) is made of a resilient material, whereby when the band is inserted into the groove (44), the band is constrained by the groove and the mouth (35) of the receptacle defined by the band is made narrower than when the band is withdrawn from the groove. Thus when the band is withdrawn from the groove (44), the mouth (35) of the receptacle opens out (arrows R and S), making it easier to empty.

9 Claims, 9 Drawing Sheets

MEANS FOR COLLECTING GARDEN WASTE

The present invention concerns blower-vacuum devices having means for collecting garden waste. In particular, it concerns such blower-vacuum devices wherein the means for collecting garden waste comprises both an attachment part for receiving a garden waste receptacle and a garden waste receptacle for removable engagement with the attachment part. The present invention also concerns garden waste receptacles for removable engagement with an attachment part of blower-vacuum devices.

Blower-vacuum devices, commonly referred to as blowervacs, are typically used for collecting garden waste, such as leaves, grass cuttings and twigs. They generally comprise a motor having an output shaft connected to a fan. The motor is usually either petrol or electrically powered. The fan is enclosed within a chamber called a volute and is configured to draw air in along its axis of rotation and expel air out tangentially when the fan is driven by the motor. Fans having such a configuration are properly called impellers. The interior of the volute is shaped to enable the flow of air generated by the fan in operation. Accordingly, the volute is in essence disc-shaped and is provided with both an inlet generally aligned with the impeller's axis of rotation and at least one outlet located at a point on the periphery of the volute.

As their name implies, blowervacs have two modes of operation: blowing and vacuuming. In the blowing mode of operation, clean air is drawn into the volute from the atmosphere via the inlet thereto and is expelled via the outlet. A blower tube is attached to the outlet in order to concentrate and direct the expelled air into a jet, which may be aimed in different directions by pointing the blower tube as desired. In the vacuuming mode of operation, garden waste may be collected up a vacuum tube connected to the blowervac in one of two ways, usually known as clean fan and dirty fan operation. In clean fan operation of a blowervac in vacuuming mode, clean air is drawn into the volute from the atmosphere via the inlet thereto in the same manner as for blowing operation and the air expelled from the volute through the outlet thereof is directed towards a collection device or receptacle. The receptacle is porous to the passage of air therethrough and is also fed by the vacuum tube with air from ground level. Air passing into the receptacle from the volute therefore causes air to be sucked up the vacuum tube as well. Garden waste entrained with the air passing up the vacuum tube is collected in the receptacle without passing through the fan; hence, clean fan operation. In contrast, in dirty fan operation, an air-porous receptacle for garden waste is attached directly to the outlet from the volute and the vacuum tube is instead attached to the inlet thereto. In this latter case, garden waste entrained with air passing up the vacuum tube enters the volute via the inlet thereto and collides with the fan, before being expelled via the outlet of the volute into the receptacle; hence, dirty fan operation. Collision of the garden waste with the fan causes the fan to mulch the garden waste into smaller particles. Since garden waste mulched in this fashion contains far fewer air pockets than unmulched garden waste, the volume ratio of unmulched to mulched garden waste can be as much as 10:1. Dirty fan operation is therefore generally preferable to clean fan operation of a blowervac in vacuuming mode because the garden waste receptacle can store a much larger mass of garden waste in the same volume once it has been mulched than of unmulched waste.

An example of a conventional blowervac provided with means for collecting garden waste is shown in FIGS. 1 and 2, which both represent the model GW200 blowervac of Black & Decker configured for use in the vacuuming mode thereof with a dirty fan. Referring firstly to FIG. 1, it may be seen that this blowervac comprises a hand-holdable unit 10 having two handles 12 and 20 for grasping by a user. Hand-holdable unit 10 contains a motor which is oriented in a generally horizontal direction and is operated by an on/off switch 16. The output shaft of the motor extends from hand-holdable unit 10 into the interior of a volute 22, which is attached to hand-holdable unit 10 and which encloses an impeller connected to the output shaft of the motor. In this mode of operation, when the motor is activated by operation of on/off switch 16, air and garden waste are drawn up a vacuum tube 26 into volute 22 in the direction indicated by arrow J, where the garden waste collides with and is mulched by the impeller, before being ejected through outlet 28 of volute 22 in the direction indicated by arrow K.

FIG. 1 also shows an attachment part of this blowervac for receiving a garden waste receptacle. As may be seen from FIG. 1, this attachment part comprises front and rear lugs 2, 4 and a locking tube 6 having bayonet tracks 8 formed on the exterior surface thereof. The operation of this attachment part for receiving a garden waste receptacle will now be described with reference to FIG. 2.

FIG. 2 shows a garden waste receptacle 30 comprising an air-porous bag. The bag is enclosed on itself so as not to have a mouth. Instead, garden waste receptacle 30 further comprises a rigid entry tube 18 permanently affixed to the bag, whereby mulched garden waste may enter the bag. Entry tube 18 has an interior diameter just larger than the exterior diameter of locking tube 6. Entry tube 18 is also provided with bayonet fittings on its inner surface adapted to engage with the bayonet tracks 8 formed on the exterior surface of locking tube 6. Thus when entry tube 18 is slid over locking tube 6 in the manner shown in FIG. 2 and twisted to ensure engagement of the bayonet fittings formed on the inner surface thereof with the bayonet tracks 8 of locking tube 6, garden waste ejected through outlet 28 of volute 22 is expelled into the interior of the air-porous bag. On the other hand, since it would be very difficult to empty the air-porous bag through the small aperture provided by entry tube 18, access to the interior of the bag for the purposes of emptying it is instead provided by a zipper 34. When opened, zipper 34 creates an aperture in the bag very much larger than that provided by entry tube 18.

In order to accommodate the weight of garden waste collected in the bag of receptacle 30 without putting undue strain on the joint between the bag and entry tube 18, as well as to ensure that receptacle 30 does not swing like a pendulum from outlet 28 of volute 22 during use of the blowervac, receptacle 30 is further provided with a rubber loop 36 threaded into the upper face of the bag as shown in FIG. 2. Rubber loop 36 is exposed at two locations along its length to provide hooks 38, 40 which may be hung over lugs 2, 4 of the attachment part of the blowervac, in the manner indicated in FIG. 2 by arrows P and Q, respectively. This ensures that receptacle 30 is held along the entire length of rubber loop 36, thereby preventing it from swinging like a pendulum, and that the weight of any garden waste collected therein is also distributed along the length of rubber loop 36, thereby removing the strain from the joint between the bag and entry tube 18.

However, whereas the arrangement shown in FIGS. 1 and 2 is generally very convenient for collecting garden waste during operation of a blowervac in the vacuuming mode thereof, emptying receptacle 30 is a complicated and many-stepped procedure. Garden waste receptacle 30 cannot be emptied through zipper 34 without firstly detaching receptacle 30 from attachment part 2, 4, 6, 8. This is because hand-holdable unit 10, volute 22 and vacuum tube 26 are too heavy and cumbersome to be tipped and shaken along with receptacle 30 when garden waste is emptied out through zipper 34. Accordingly, before zipper 34 is opened and receptacle 30 is emptied, a user must firstly place the entire blowervac down, unhook hooks 38 and 40 from lugs 2 and 4 respectively, unscrew entry tube 18 from locking tube 6 and detach receptacle 30 from volute outlet 28 by removing entry tube 18 from around locking tube 6. Zipper 34 may then be opened and garden waste receptacle 30 emptied by tipping the contents thereof out through zipper 34. Before the blowervac may be used for collecting any more garden waste, receptacle 30 must of course be reattached to attachment part 2, 4, 6, 8 by performing the same steps in reverse.

The present invention addresses this problem. Accordingly, in a first aspect, the present invention provides a blower-vacuum device having means for collecting garden waste, the garden waste collecting means comprising: an attachment part for receiving a garden waste receptacle; and a garden waste receptacle for removable engagement with the attachment part; wherein the attachment part comprises an arcuate groove; and the garden waste receptacle comprises a band defining a mouth of said receptacle for sliding engagement with said groove.

In a second aspect, the present invention also provides a garden waste receptacle for removable engagement with an attachment part of a blower-vacuum device; wherein the receptacle comprises a band defining a mouth of said receptacle for sliding engagement with an arcuate groove of the attachment part of the blower-vacuum device.

Thus the receptacle may be easily removed from the attachment part of the blower-vacuum device merely by sliding the band of the receptacle out of the groove, whereupon the receptacle may then be emptied of garden waste by tipping it upside-down.

In a preferred embodiment of the invention, the garden waste receptacle further comprises a handle for inserting the band of the receptacle into the groove and withdrawing it therefrom. This allows a blowervac according to the invention to be emptied very easily indeed, since the portion of the blowervac comprising the attachment part may be held in one hand and the handle of the garden waste receptacle grasped in the other. The receptacle may then be disengaged from the attachment part merely by separating the two parts using the handle to pull on the receptacle and without firstly having to place the blowervac down. Then, whilst still holding the portion of the blowervac comprising the attachment part in one hand, the receptacle can be turned upside-down in order to empty it and re-engaged with the attachment part by continuing to grasp the handle of the receptacle in the other hand throughout.

The band defining the mouth of the receptacle is preferably made of a resilient material, whereby when the band is inserted into the groove, the band is constrained by the groove and the mouth of the receptacle defined by the band is made narrower than when the band is withdrawn from the groove. Thus when the band is withdrawn from the groove, the mouth of the receptacle opens out, making it easier to empty. In a preferred embodiment, the band is made of metal, rendering the band both easy to manufacture and very resistant to damage, allowing for many repeated withdrawals and reinsertions of the band into the groove.

It is also desirable that the garden waste receptacle comprises a latch and the attachment part comprises means for engagement with this latch, whereby when the band is inserted into the groove, the latch engages with the engagement means of the attachment part, thereby preventing withdrawal of the band from the groove until the latch has been disengaged from this engagement means. This ensures that the receptacle does not become accidentally disengaged from the attachment part during use.

In order to collect garden waste, the receptacle may comprise either a rigid part or a flexible part, such as a bag made of air-porous material. In the latter case, however, it is preferable for the band of the receptacle to be enclosed along at least a part of its length by the air-porous material of the bag part. This may be achieved, for example, by folding the edge of the air-porous material over the band until it comes into contact with itself and then either stitching or gluing the material back on itself. Having the band enclosed along at least a part of its length by the air-porous material of the bag part allows this material to act as a friction-reducing layer interposed between the band of the receptacle and the groove of the attachment part when the band and the groove are brought into contact with each other, thereby making insertion of the band into the groove and its withdrawal therefrom both smoother and easier.

This and other features and advantages of the present invention will be better understood from the following detailed description, which is given by way of example and with reference to the accompanying drawings, in which.

Figure 1:
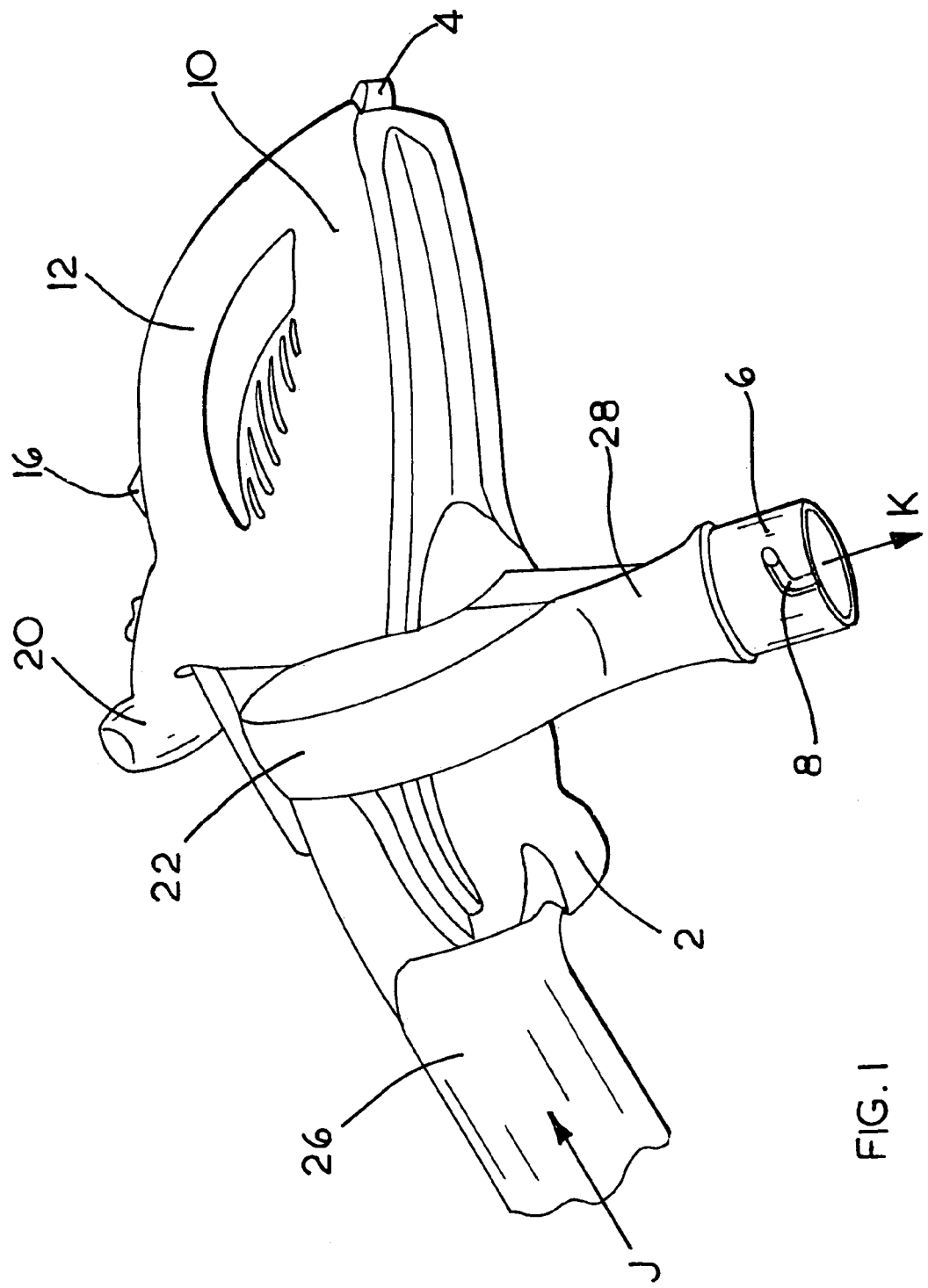
FIG. 1 shows the attachment part of a conventional blowervac configured for use in a vacuuming mode of operation with a dirty fan.
Figure 2:
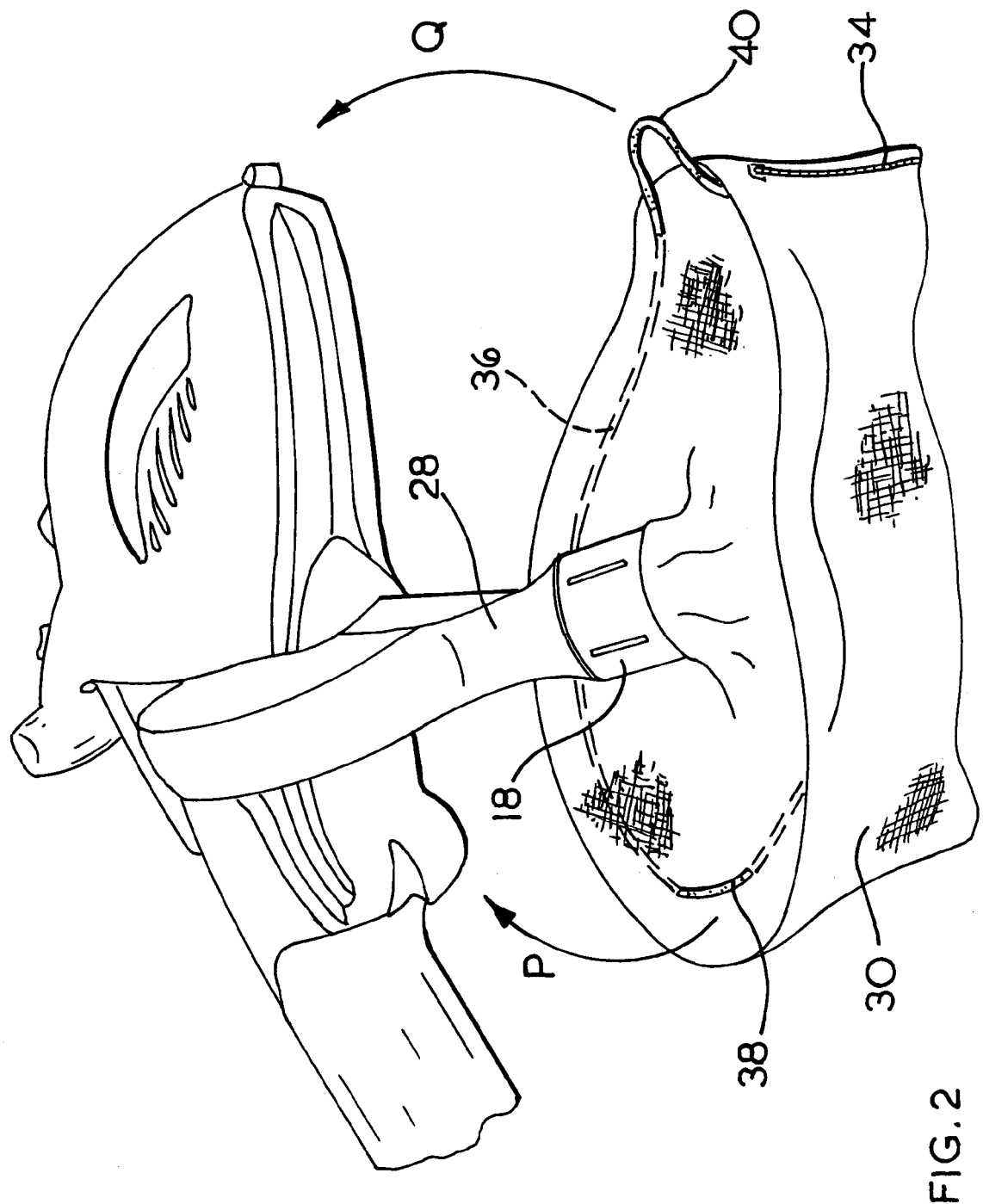
FIG. 2 shows the conventional blowervac of FIG. 1 with a receptacle for collecting garden waste partially attached to the attachment part thereof.
Figure 3:
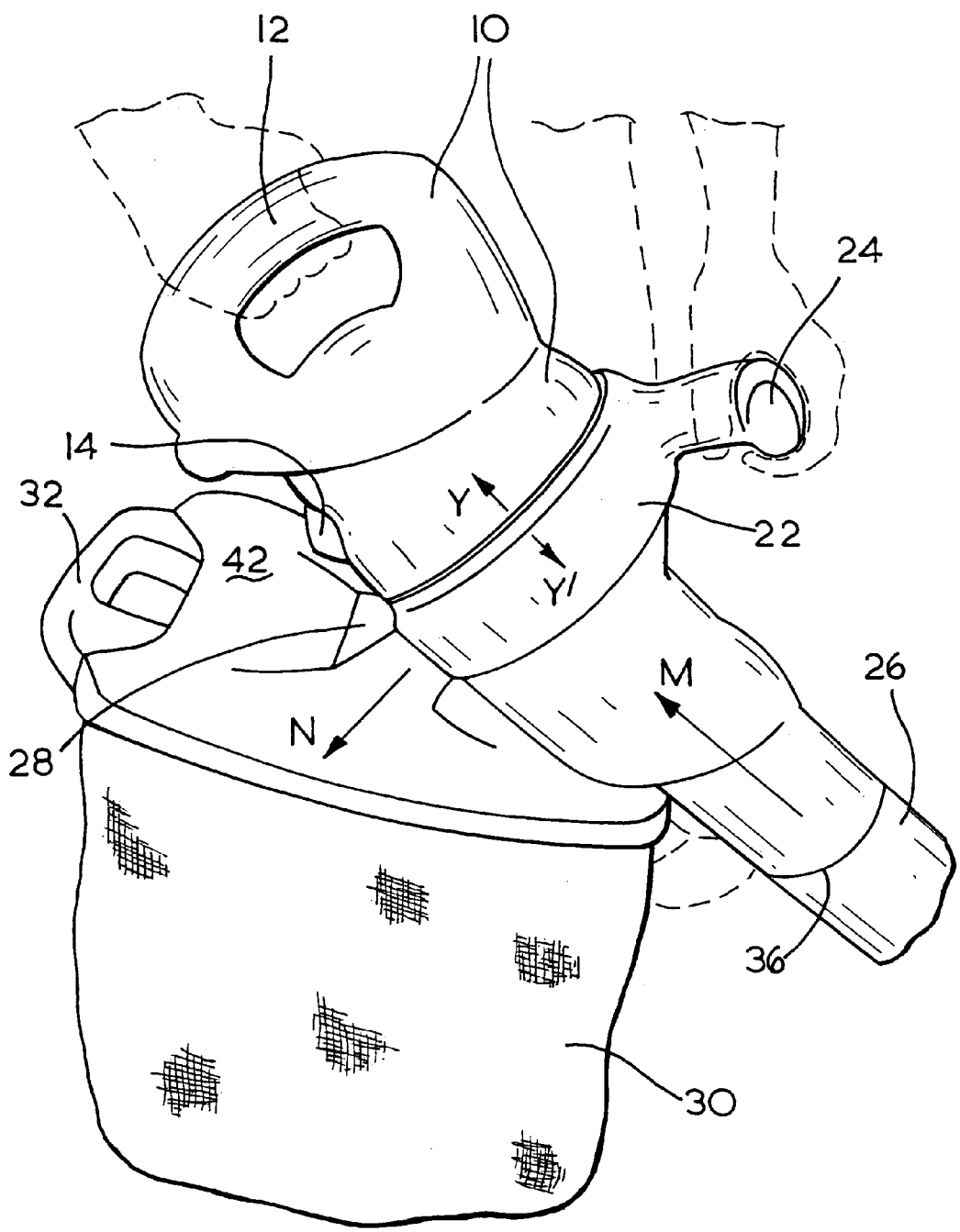
FIG. 3 shows a blowervac having means for collecting garden waste according to the invention.

Referring firstly to FIG. 3, there is shown a blowervac according to the invention configured for use in a vacuuming mode of operation with a dirty fan, in which dashed lines represent the lower body portion of a user and like reference numerals have been used to represent similar parts to those of the conventional blowervac shown in FIG. 1. As may be seen from FIG. 3, this embodiment of a blowervac according to the invention comprises a hand-holdable unit 10, a volute 22 and a vacuum tube 26. Hand-holdable unit 10, which comprises a motor, has a handle 12 for grasping by the user and is also provided with a power inlet 14 for attachment of a cable to supply electrical power to the motor. In this configuration, the motor is oriented in a generally horizontal direction and the output shaft of the motor extends from hand-holdable unit 10 into the interior of volute 22. Volute 22, which is provided with a further handle 24 for grasping by the user, encloses an impeller connected to the output shaft of the motor. During operation, air and garden waste are drawn up vacuum tube 26 into volute 22 in the direction indicated by arrow M, where the garden waste collides with and is mulched by the impeller, before being ejected through outlet 28 of volute 22 in the direction indicated by arrow N. Garden waste ejected through outlet 28 of volute 22 is expelled into the interior of a garden waste receptacle 30, comprising a bag part made of an air-porous material, such as nylon, and a handle 32. Garden waste receptacle 30 engages with the rest of the blowervac in a removable fashion by means of an attachment part 42, which is formed integrally with volute 22.

Volute 22 is detachable from hand-holdable unit 10 by pulling hand-holdable unit 10 and volute 22 in opposite directions, as indicated in FIG. 3 by arrows Y and Y', respectively. This allows easy access to both the impeller and the interior of volute 22 for cleaning purposes in case they become clogged with garden waste. Vacuum tube 26 can also be separated from volute 22 at the join indicated by reference numeral 36, allowing the blowervac to be disassembled and stored without taking up a large amount of space.

Figure 4:
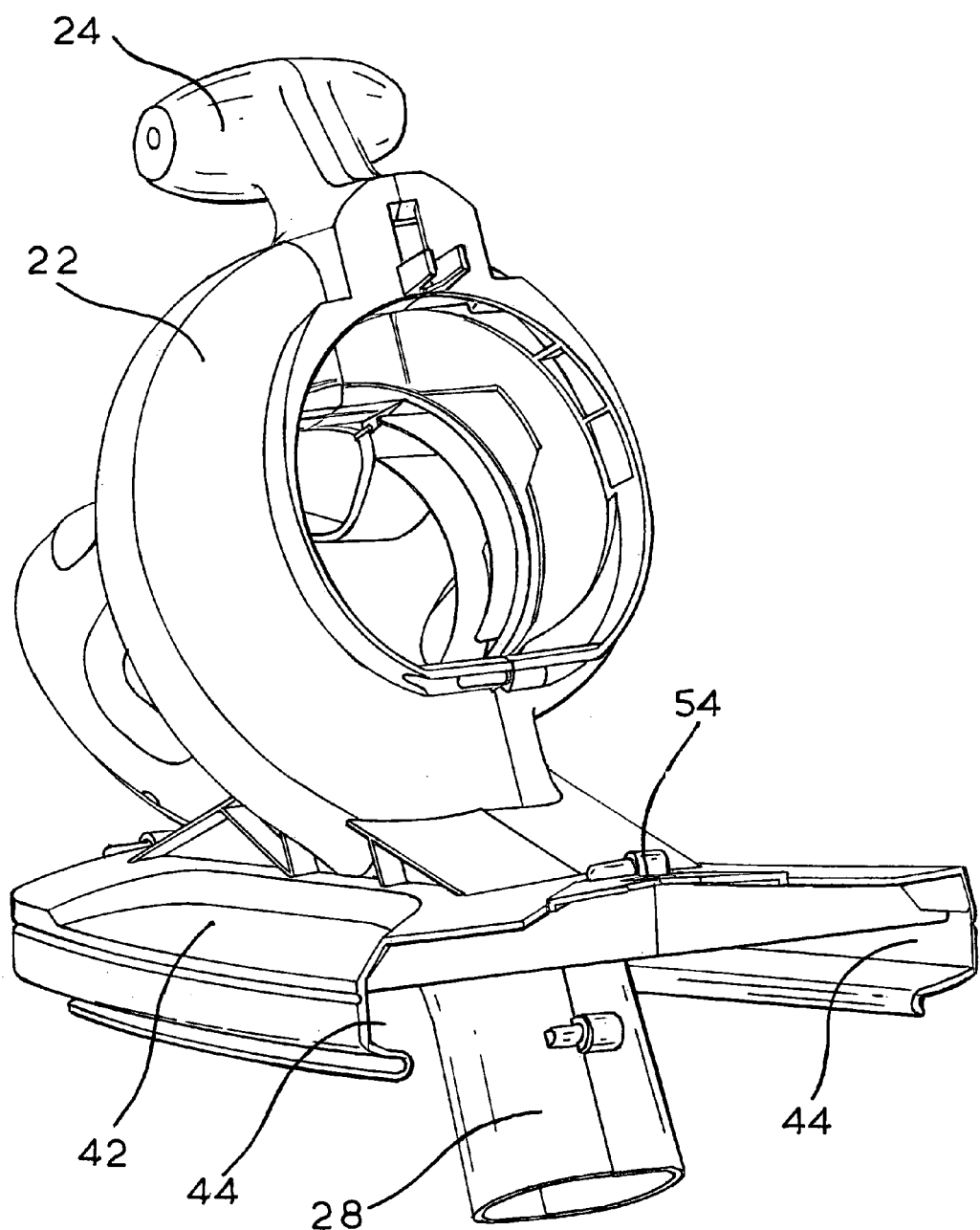
FIG. 4 is a perspective view from one side of the rear of the attachment part of the blowervac shown in FIG. 3, without a receptacle for collecting garden waste engaged therewith.
Figure 5:
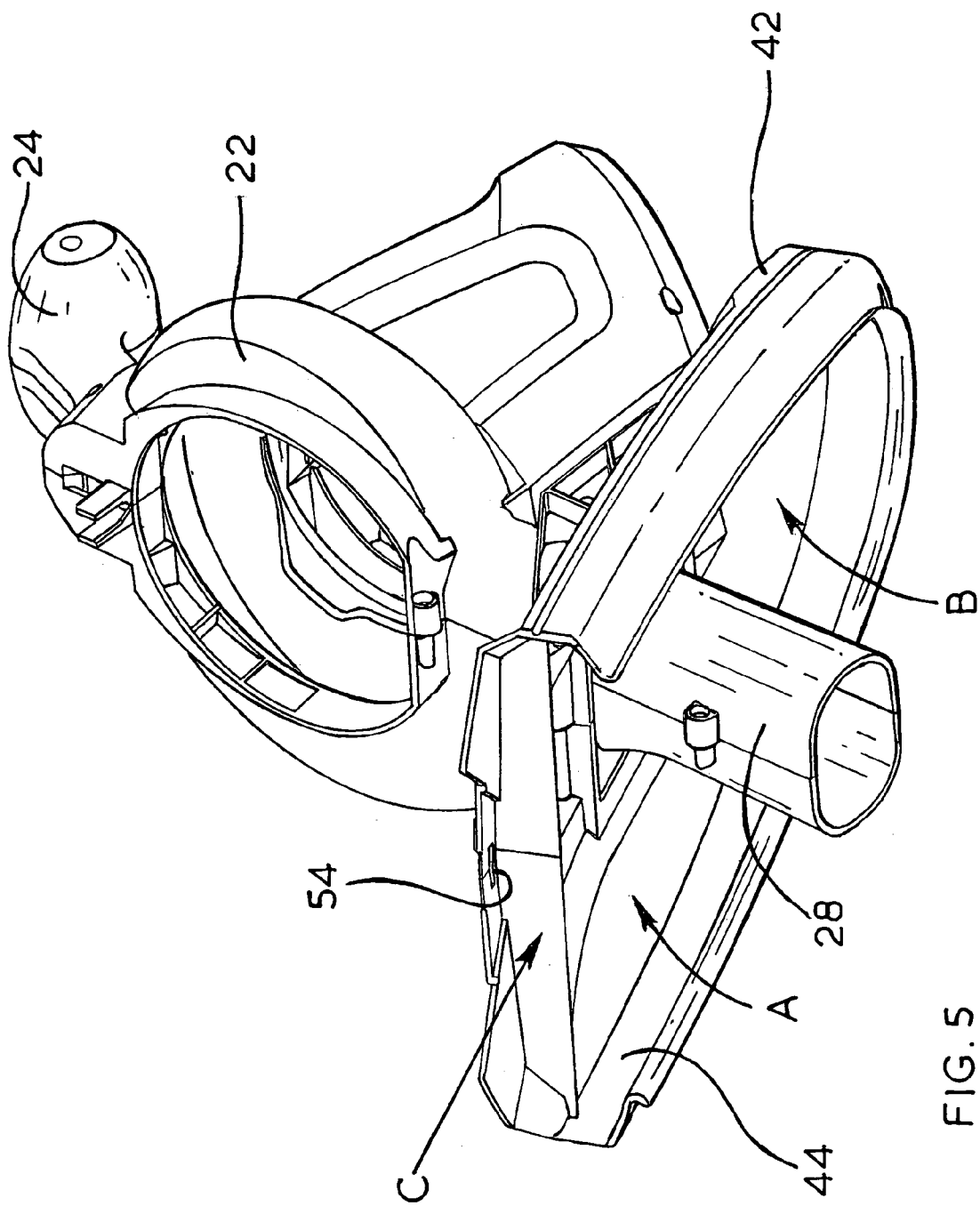
FIG. 5 is a perspective view from underneath of the rear of the attachment part of the blowervac shown in FIG. 3, without a receptacle for collecting garden waste engaged therewith.
Figure 6:
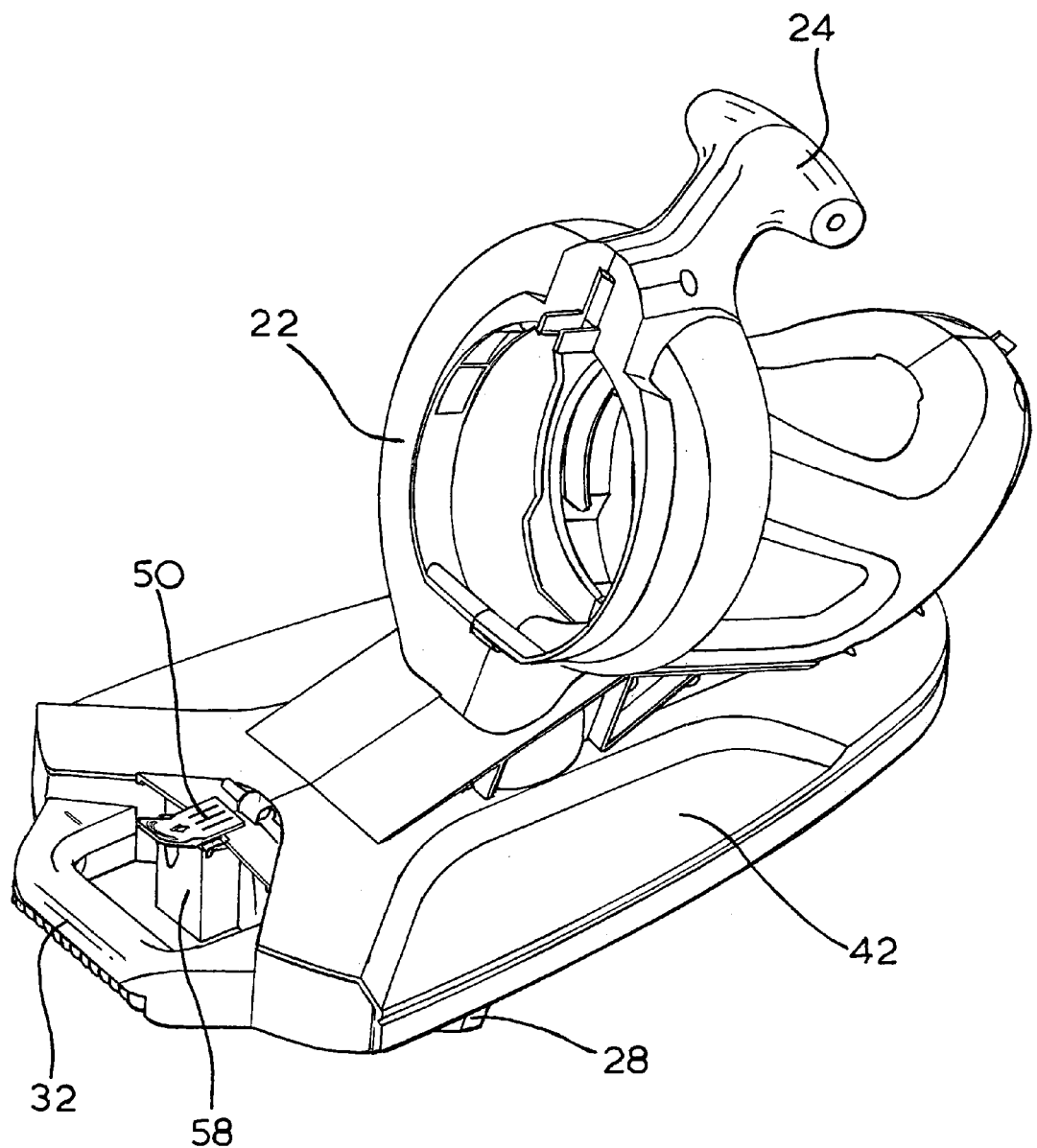
FIG. 6 is a perspective view from above of the rear of the attachment part of the blowervac shown in FIG. 3, having a receptacle for collecting garden waste engaged therewith.

Attachment part 42 will now be described in greater detail with reference to FIGS. 4 to 6, in all of which hand-holdable unit 10 and vacuum tube 26 have been detached from volute 22 for greater clarity. As may be seen from FIGS. 4 and 5, attachment part 42 comprises an arcuate groove 44. Garden waste receptacle 30 may be engaged with attachment part 42 firstly by putting the mouth of receptacle 30 around outlet 28 of volute 22 in the manner indicated in FIG. 5 by arrows A and B and then by sliding the receptacle 30 into groove 44 in the direction of arrow C until receptacle 30 is located in the position shown in FIG. 6. Receptacle 30 may subsequently be removed from attachment part 42 by performing the same operations in reverse. Outlet 28 of volute 22 is made sufficiently long to prevent a user from being able to insert a finger into the interior of volute 22, thereby risking injury from the impeller when the motor is running. However, if outlet 28 of volute 22 is shorter than that shown in FIGS. 4 to 6, receptacle 30 may then be engaged with attachment part 42 in a single motion, merely by sliding receptacle 30 into groove 44 in the direction indicated by arrow C. In such a case, receptacle 30 may also be removed from attachment part 42 in a single motion by withdrawing it from groove 44 in the opposite direction to arrow C.

Figure 7:
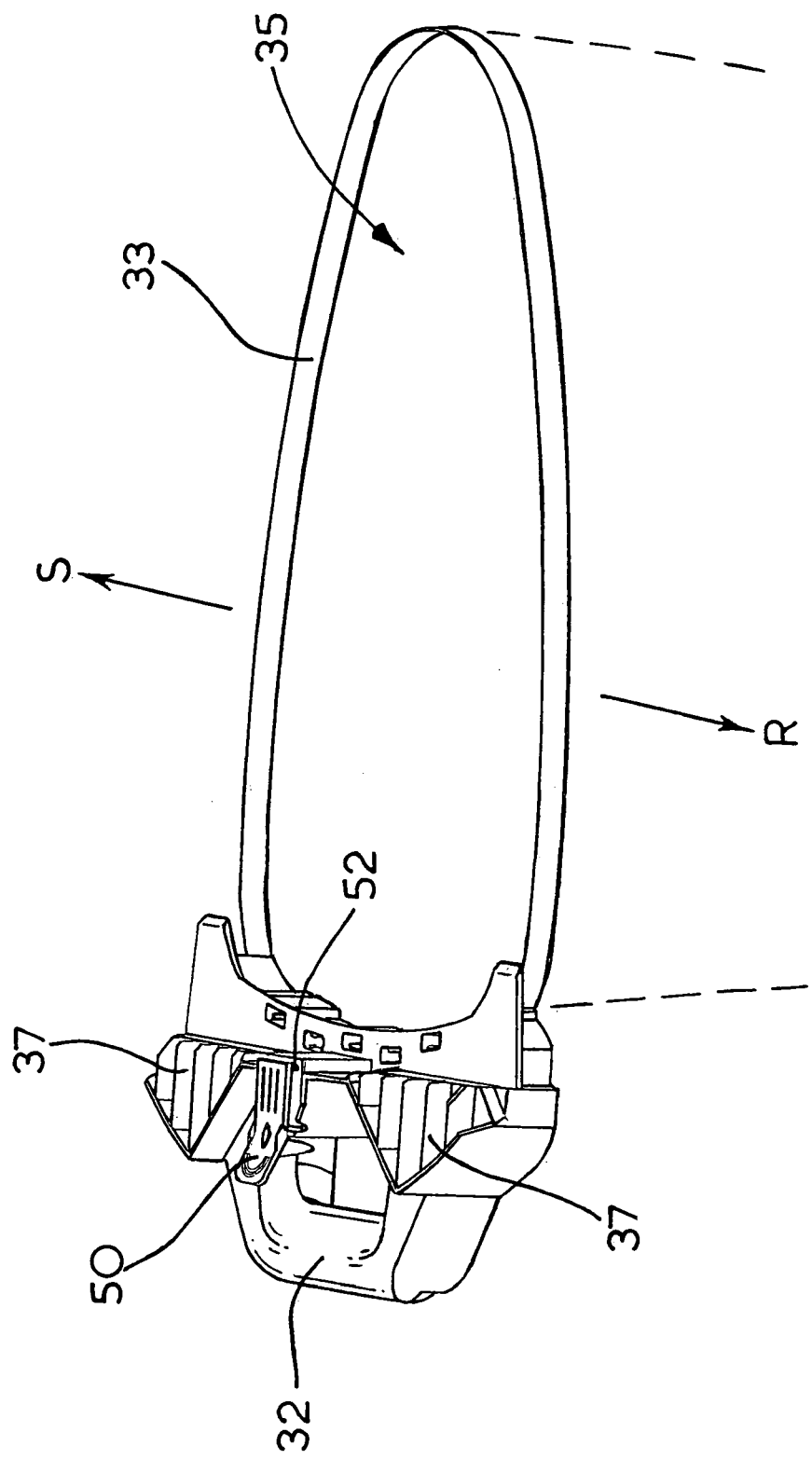
FIG. 7 is a perspective view from one side of the band and handle of a garden waste receptacle according to the invention.

FIG. 7 shows the parts of garden waste receptacle 30 which engage with attachment part 42. As shown in FIG. 7, receptacle 30 comprises a band 33 defining a mouth 35 of receptacle 30. For the purposes of explanation, a bag part of receptacle 30 has been omitted from FIG. 7; however, such a bag part is attached to band 33 in the location generally indicated in FIG. 7 by dashed lines. Band 33 is suitably shaped and sized to slide into engagement with groove 44 of attachment part 42 and is made of metal, which naturally tends to expand outwardly under its own resiliency in the directions indicated in FIG. 7 by arrows R and S. Thus when band 33 is slid into groove 44 in the direction indicated in FIG. 6 by arrow C, the outer surfaces of band 33 press against the inner surfaces of groove 44. This ensures that receptacle 30 is held tightly in place by groove 44 and is prevented from falling out of attachment part 42 accidentally. On the other hand, it also ensures that when band 33 is withdrawn from groove 44, mouth 35 of receptacle 30 opens out in the direction of arrows R and S, making it easier to empty. In an alternative embodiment not shown in the drawings, band 33 may instead be made of a rigid material, such as a plastics material moulded integrally with handle 32.

Returning to FIG. 7, it may also be seen that the interface of band 33 with handle 32 is provided with ribs 37 aligned in a plane perpendicular to that of band 33. These ribs ensure that when handle 32 is used to withdraw receptacle 30 from groove 44 and re-engage it therewith, the weight of receptacle 30 and any garden waste contained therein, which is carried by band 33, does not cause band 33 to separate from handle 32 or become misaligned therewith.

Although not shown in FIG. 7, in this embodiment, the air-porous material of the bag part of receptacle 30 is joined to band 33 by the edge of the air-porous material being folded over band 33 along its length and then being stitched or glued together.

Figure 8:
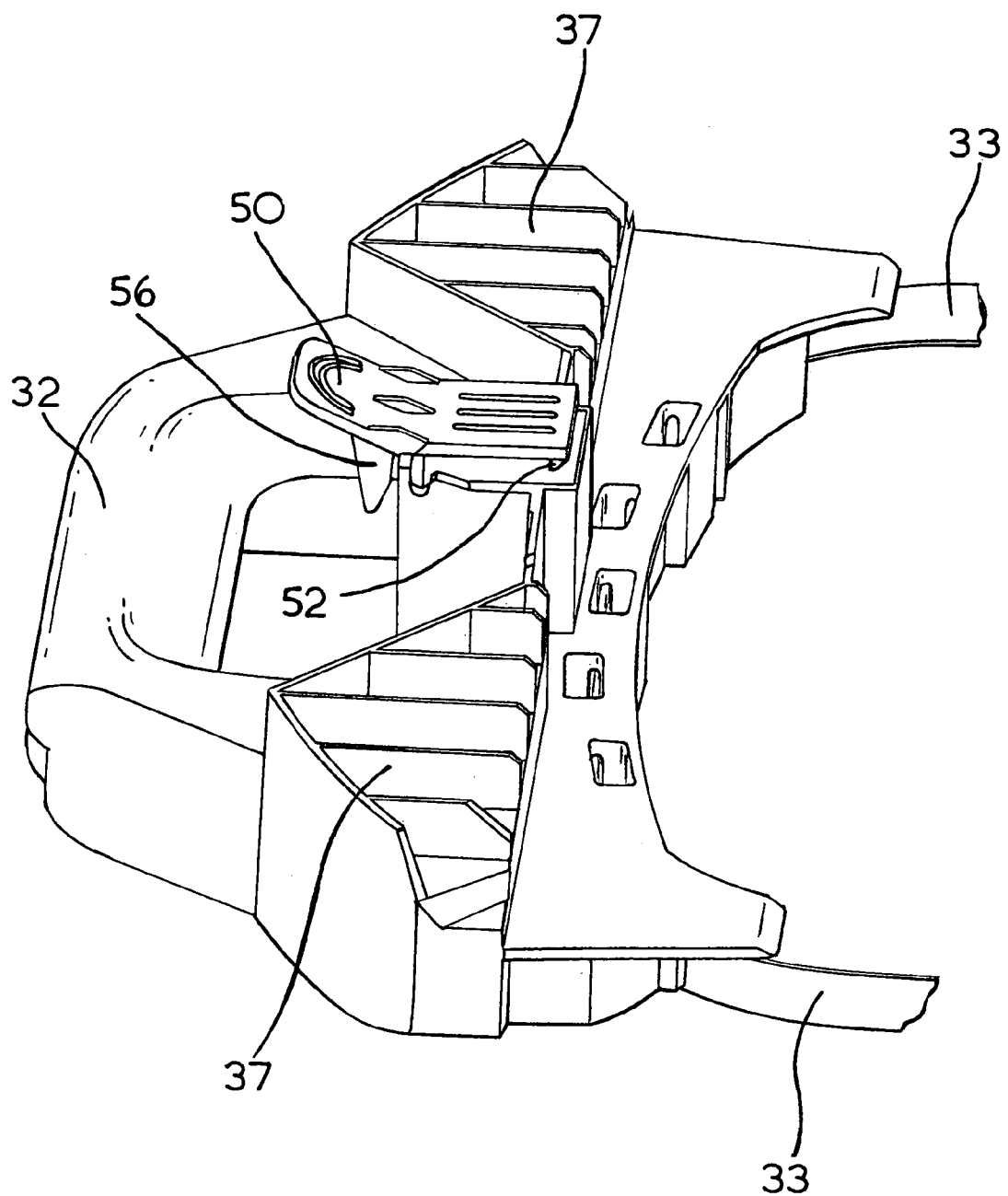
FIG. 8 is a close-up perspective view of the handle end of FIG. 7.
Figure 9:
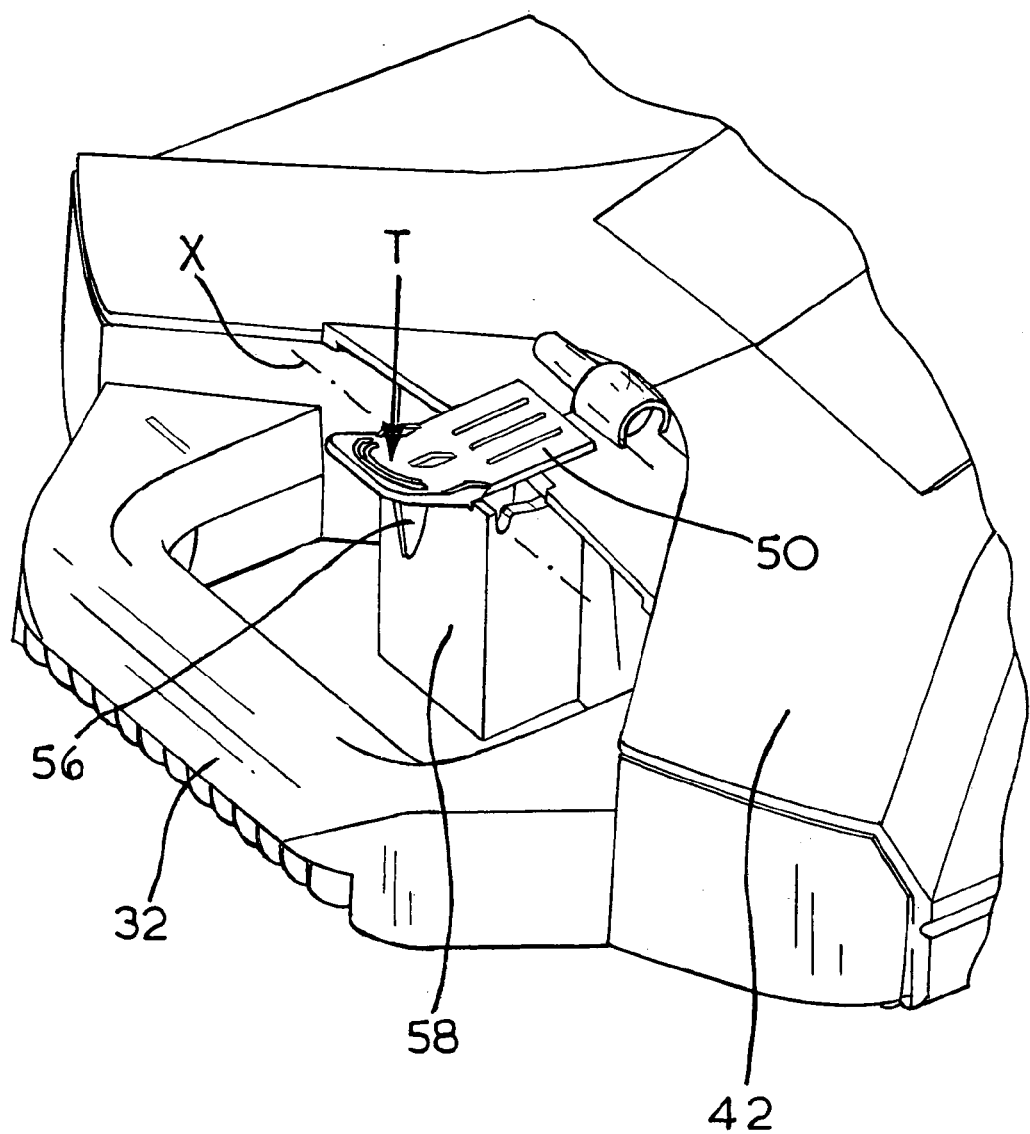
FIG. 9 is a close-up perspective view of the handle end of FIG. 6, showing the latch of the garden waste receptacle and the engagement means of the attachment part.

Finally, FIG. 7 also shows a latch 50 of receptacle 30 having a tooth 52 formed on the end thereof, both of which may be seen more clearly in the close-up view of FIG. 8. As may be seen in FIG. 8, tooth 52 is of a suitable shape and size to engage with engagement means 54 of attachment part 42 visible in FIGS. 4 and 5. Thus when band 33 is slid into groove 44, tooth 52 lodges in engagement means 54 in the manner shown in FIGS. 6 and 9. Band 33 may then only be withdrawn from groove 44 by firstly depressing latch 50 in the direction indicated in FIG. 9 by arrow T. This ensures that receptacle 30 cannot slide out of groove 44 in a direction opposite to that indicated in FIG. 5 by arrow C accidentally and of its own accord. Latch 50 is a so-called "living" spring. Depressing latch 50 in the direction indicated in FIG. 9 by arrow T therefore causes latch 50 to pivot about axis X, thereby disengaging tooth 52 from engagement means 54. However, latch 50 is also provided with an end stop 56 (see also FIG. 8) which abuts against wall 58 of receptacle 30. This prevents latch 50 from pivoting about axis X further than its mechanical properties will accept. Thereafter, when latch 50 is no longer depressed in the direction of arrow T, latch 50 returns to a position in which tooth 52 can re-engage with engagement means 54.

The invention claimed is:

1. A blower-vacuum device having means for collecting garden waste comprising:
 an attachment part (42) for receiving a garden waste receptacle;
 a garden waste receptacle (30) for removable engagement with said attachment part;
 wherein the attachment part (42) comprises an arcuate groove (44) and the garden waste receptacle (30) comprises a band (33) defining a mouth (35) of said receptacle for sliding engagement with said groove (44); and
 wherein the garden waste receptacle (30) comprises a latch (50) and the attachment part (42) comprises means (54) for engagement with said latch, whereby when said band (33) is inserted into said groove (44), the latch (50) engages with the engagement means (54), thereby preventing withdrawal of said band from said groove until the latch has been disengaged from the engagement means.

2. A blower-vacuum device having means for collecting garden waste comprising:
 an attachment part (42) for receiving a garden waste receptacle;
 a garden waste receptacle (30) for removable engagement with said attachment part;
 wherein the attachment part (42) comprises an arcuate groove (44) and the garden waste receptacle (30) comprises a band (33) defining a mouth (35) of said receptacle for sliding engagement with said groove (44); and
 wherein the band (33) is enclosed along at least a part of its length by air-porous material of a bag part of the garden waste receptacle (30).

3. A blower-vacuum device having means for collecting garden waste comprising:

an attachment part (42) for receiving a garden waste receptacle, the attachment part having an arcuate groove defining a plane;

a garden waste receptacle (30) for removable engagement with said attachment part, the garden waste receptacle having a band (33) defining a mouth (35) for receipt of garden waste and sliding in the plane of the arcuate groove to engage said attachment part; and wherein the arcuate groove has an open end for sliding insertion of the band.

4. The blower-vacuum device according to claim 3, wherein the garden waste receptacle (30) further comprises a handle (32) for inserting said band (33) into and withdrawing said band from said groove (44).

5. The blower-vacuum device according to claim 3, wherein the band (33) is made of a resilient material, whereby when said band is inserted into said groove (44), the band is constrained by said groove to be narrower than when said band is withdrawn from said groove.

6. A blower-vacuum device having means for collecting garden waste comprising:

an attachment part (42) for receiving a garden waste receptacle, the attachment part having an arcuate groove defining a plane;

a garden waste receptacle (30) for removable engagement with said attachment part, the garden waste receptacle having a band (33) defining a mouth (35) for receipt of garden waste and sliding in the plane of the arcuate groove to engage said attachment part; and wherein the garden waste receptacle (30) comprises a latch (50) and the attachment part (42) comprises notch for engagement with said latch, whereby when said band (33) is inserted into said groove (44), the latch (50) engages with the notch, thereby preventing withdrawal of said band from said groove until the latch has been disengaged from the notch.

7. A blower-vacuum device having means for collecting garden waste comprising:

an attachment part (42) for receiving a garden waste receptacle, the attachment part having an arcuate groove on its interior surface;

a garden waste receptacle (30) for removable engagement with said attachment part, the garden waste receptacle having a band (33) defining a mouth (35) for receipt of garden waste and sliding in the arcuate groove to engage said attachment part; and wherein the garden waste receptacle (30) comprises a latch (50) and the attachment part (42) comprises notch for engagement with said latch, whereby when said band (33) is inserted into said groove (44), the latch (50) engages with the notch, thereby preventing withdrawal of said band from said groove until the latch has been disengaged from the notch.

8. The blower-vacuum device according to claim 7, wherein the garden waste receptacle (30) further comprises a handle (32) for inserting said band (33) into and withdrawing said band from said groove (44).

9. The blower-vacuum device according to claim 7, wherein the band (33) is made of a resilient material, wherein the band (33) is made of a resilient material, whereby when said band is inserted into said groove (44), the band is constrained by said groove to be narrower than when said band is withdrawn from said groove.

\* \* \* \* \*